(12) United States Patent
Gulliksson

(10) Patent No.: US 8,077,213 B2
(45) Date of Patent: Dec. 13, 2011

(54) METHODS FOR CAPTURING A SEQUENCE OF IMAGES AND RELATED DEVICES

(75) Inventor: Johan Gulliksson, Bjärred (SE)

(73) Assignee: Sony Ericsson Mobile Communications AB, Lund (SE)

( * ) Notice: Subject to any disclaimer, the term of this patent is extended or adjusted under 35 U.S.C. 154(b) by 487 days.

(21) Appl. No.: 11/571,497

(22) PCT Filed: Jun. 17, 2005

(86) PCT No.: PCT/EP2005/006641
§ 371 (c)(1),
(2), (4) Date: Nov. 20, 2007

(87) PCT Pub. No.: WO2006/002796
PCT Pub. Date: Jan. 12, 2006

(65) Prior Publication Data
US 2008/0180550 A1   Jul. 31, 2008

Related U.S. Application Data

(60) Provisional application No. 60/586,357, filed on Jul. 8, 2004.

(30) Foreign Application Priority Data

Jul. 2, 2004   (EP) .................................. 04388044

(51) Int. Cl.
*H04N 5/225*   (2006.01)
*H04N 7/00*   (2006.01)
(52) U.S. Cl. ...................................... 348/218.1; 348/36
(58) Field of Classification Search .................. 348/239, 348/218.1, 36–39
See application file for complete search history.

(56) References Cited

U.S. PATENT DOCUMENTS
3,665,826 A * 5/1972 Karpol .......................... 396/192
(Continued)

FOREIGN PATENT DOCUMENTS
EP   0462905 B1   1/1997
(Continued)

OTHER PUBLICATIONS

Written Opinion of the International Searching Authority corresponding to PCT Application No. PCT/EP05/006641 mailed Sep. 20, 2005.
(Continued)

*Primary Examiner* — Jason Chan
*Assistant Examiner* — Gary C Vieaux
(74) *Attorney, Agent, or Firm* — Myers Bigel Sibley & Sajovec, P.A.

(57) ABSTRACT

A sequence of images is captured by an imaging device and stored in a digital format. After having captured and stored at least one image, a user is guided to move the device so that an image that can be stitched to the stored image can be captured. Positional information indicating the current orientation of the device is provided; positional information indicating the orientation of the device at the time of capturing each captured image is stored; and the current positional information and the positional information stored for the stored image is utilized for guiding the user to move the device to an orientation where an image that can be stitched to the stored image can be captured.

26 Claims, 6 Drawing Sheets

U.S. PATENT DOCUMENTS

| | | | |
|---|---|---|---|
| 5,262,867 A * | 11/1993 | Kojima | 348/39 |
| 5,517,261 A * | 5/1996 | Sharif et al. | 351/246 |
| 6,304,284 B1 * | 10/2001 | Dunton et al. | 348/36 |
| 6,788,828 B2 * | 9/2004 | Katayama et al. | 382/284 |
| 7,423,671 B2 * | 9/2008 | Kiso | 348/218.1 |
| 2001/0045986 A1 | 11/2001 | Edwards | |
| 2002/0075389 A1 * | 6/2002 | Seeger et al. | 348/222 |
| 2006/0268129 A1 * | 11/2006 | Deng | 348/239 |

FOREIGN PATENT DOCUMENTS

| | | | |
|---|---|---|---|
| EP | 0942598 A2 | | 9/1999 |
| EP | 942598 A2 * | | 9/1999 |
| EP | 0942598 A3 | | 9/1999 |
| EP | 1309171 A2 | | 5/2003 |
| EP | 1379073 A1 | | 1/2004 |
| JP | 04029124 A * | | 1/1992 |
| WO | WO 03/105466 A | | 12/2003 |

OTHER PUBLICATIONS

International Search Report corresponding to PCT Application No. PCT/EP05/006641 mailed Sep. 20, 2005.

* cited by examiner

METHODS FOR CAPTURING A SEQUENCE OF IMAGES AND RELATED DEVICES

CROSS-REFERENCE TO RELATED APPLICATIONS

The present application is a 35 U.S.C. §371 national phase application of PCT International Application No. PCT/EP2005/006641, filed on Jun. 17, 2005, which claims priority from European Application Serial No. 04388044.2 filed on Jul. 2, 2004 and from U.S. Provisional Patent Application No. 60/586,357 filed on Jul. 8, 2004, the disclosures and contents of which are incorporated by reference herein in their entireties. The above-referenced PCT International Application was published in the English language as International Publication No. WO 2006/002796.

FIELD OF THE INVENTION

The invention relates to a method of capturing a sequence of images by an imaging device and storing said images in a digital format.

DESCRIPTION OF RELATED ART

Picture stitching is a technique where overlapping digital images taken in a sequence can form e.g. one panoramic or 360 degree virtual image. To provide the panoramic effect, a digital camera often interfaces with a computer. A sequence of partly overlapping digital images is captured by the digital camera and stored in the camera or on an external storage medium. The stored images are then subsequently transferred to the computer in which the stitching process of joining together two or more images into one panoramic image can be performed by joining edge boundaries of the images. The stitching process may also be performed in the camera itself if sufficient computational resources are available.

Typically, the method used by such stitching applications producing the stitched panoramic image demands heavy image processing to match the overlapping images correctly. During the stitching process the stitching algorithm use image processing to more or less emulate or reinvent the actual position of the camera for each image. In addition, some image colour adjustments are also made to ensure a consistent quality without any edges. In some cases the edges between frames are blended to ensure that no borders will be visible, which increases the processing demands further.

One such system is known from EP 462 905 in which an electronic camera includes a sensor for detecting an image of a subject and sensors for detecting a three dimensional position and azimuth of the camera, focusing amount and zoom amount. Each image is recorded on a record medium such as a floppy disk together with information concerning the three dimensional position in which the camera was located when the image was captured and other types of information regarding the image. In an image reproducing device images recorded on the record medium are reproduced on the basis of the information stored together with the images and showing an interrelationship between a plurality of recorded images. Thus the position information is used to help combine the images to one panoramic image, so that the processing demands are somewhat reduced because the positions do not have to be calculated from the images.

The basic idea of traditional picture stitching is based upon image analysis, where similar patterns are identified between two images. The two images can be rotated, scaled and translated in order to perform a perfect stitch. However, it is important that the two images actually are somewhat overlapped to perform a stitch successfully. If the images do not overlap the stitching algorithm will try to stitch two completely unstitchable pictures, which will fail one way or the other. A good stitching algorithm will tell the user that the pictures are not possible to stitch, while other algorithms may try to stitch the pictures anyway which will lead to a faulty panoramic picture.

However, it will often be very difficult for a user to know at the time of capturing the individual images whether they will actually overlap sufficiently. You can take a sequence of images, but you do not know if they will match or not because the actual stitching has not taken place yet.

As a help to see at the time of capturing the images whether the images overlap sufficiently it is suggested in EP 1 309 171 to guide the user by a preview strip in the viewfinder of the camera. A strip of e.g. the right portion of a previous picture is perspectively corrected and overlaid on the left portion of the current view in the viewfinder. The preview strip assists the user in aligning the current picture and the previous picture by guiding him to move the camera until the current view matches the preview strip. The camera should then be in the desired position or orientation for capturing the next image, so that the images overlap sufficiently for a stitching process to be performed.

Although this system is a good help in many situations it also has its limitations. By many types of subjects, such as leaves on trees, landscapes or buildings with a lot of similar windows, it can be very difficult to see if the pre-view strip and the current view actually overlap each other or not. If the camera is moved so much that the current view is completely outside the range of views that can be stitched with the previous image, the user will not be able to see anything in the viewfinder that matches the preview strip, and thus he will not know in which direction the camera should be moved in order to return to the stitchable range. Further, the system is less flexible because the images must be captured in a predefined order, e.g. from left to right. If the user decides to take a picture to the left of the previous picture instead of to the right of the previous picture, the preview strip will be of no help.

Therefore, it is an object of the invention to provide a method of capturing a sequence of images which can be used independently of the subject of the captured images, and which can guide a user to move the imaging device to an orientation where the current view can be stitched with a previous image even when the device is in an orientation completely outside the stitchable range. Further, the method should be so flexible that images need not be captured in a predefined order.

SUMMARY

According to the invention the object is achieved in that the method further comprises the steps of providing positional information indicating the current orientation of the imaging device; storing for each captured image positional information indicating the orientation of the imaging device at the time of capturing that image; and utilizing the current positional information and the positional information stored for said at least one image for guiding the user to move the imaging device to an orientation where an image that can be stitched to said at least one stored image can be captured.

When the guiding is based on the current orientation of the imaging device compared with the orientation of the imaging device at the time of capturing the previous image, it does not depend on the actual look of the images or the actual position or orientation of the device.

In an expedient embodiment the step of utilizing the current and stored positional information comprises the steps of calculating from the stored positional information a suggested new orientation of the imaging device; comparing the current positional information with the suggested new orientation; providing instructions for the user to move the device towards the suggested new orientation; and indicating when the suggested new orientation has been substantially reached. By providing moving instructions and indicating when the desired orientation has been reached it is easy for the user to find the orientation.

When the current positional information comprises a vector indicating the viewing direction of the imaging device the orientation of the device is achieved in an easy way which is important e.g. in the situation where the device is rotated on a tripod, so that only the orientation is changed.

The provided positional information may further indicate the position of the imaging device, which is useful e.g. when capturing images of a two dimensional subject, such as a painting on the wall or the façade of a building, so that the whole object can be placed more or less in the same focal plane for the lens. In this case the current positional information may comprise x, y and z coordinates for the location of the imaging device.

The current positional information may be provided by a motion sensor in the imaging device, and a gyroscope may be utilized in the motion sensor for providing the current positional information. Alternatively, an external sensor in e.g. an accessory unit may be used.

Further, the current positional information may comprise a current value of a zoom factor and an indication of lighting conditions in the viewing direction of the imaging device.

When the method further comprises the step of capturing automatically an image when it is indicated that said suggested new orientation has been substantially reached, the device can just be moved according to the guiding instructions, and the device will then capture a sequence of images that are suitable for stitching.

The method may further comprise the step of presenting the guiding of the user according to a selected one of a number of different stitching models indicating how images should be stitched together. Examples of such models could be horizontal panorama left to right, horizontal panorama right to left, vertical panorama top to bottom or an environment map used in 3D graphics, such as a cube or a sphere.

When the method further comprises the step of controlling a zoom factor in dependence of the current positional information and the positional information stored for said at least one image, the zoom can compensate if the imaging device is moved to a position somewhat different from the suggested new position. If, for instance, the device is moved a bit too much so that the images do no longer overlap, zooming out can make them overlap again.

When the method further comprises the step of utilizing, after having captured and stored a number of images, the positional information stored for the images for providing a combined image by stitching said images together, the stitching process can be simplified, because the stitching algorithm does not have to calculate such positional information.

As mentioned, the invention also relates to an imaging device for capturing a sequence of images, said device comprising storing means for storing said images in a digital format; and guiding means arranged to guide a user, when at least one image has been captured and stored, to move the imaging device so that an image that can be stitched to said at least one stored image can be captured. When the device further comprises means for providing positional information indicating the current orientation of the imaging device, and the device is further arranged to store for each captured image positional information indicating the orientation of the imaging device at the time of capturing that image; and to utilize the current positional information and the positional information stored for said at least one image for guiding the user to move the imaging device to an orientation where an image that can be stitched to said at least one stored image can be captured, a device is achieved that can provide guiding assistance independently of the subject of the captured images. Further, it can guide a user to move the imaging device to an orientation where the current view can be stitched with a previous image even when the device is in an orientation completely outside the stitchable range, and the images need not be captured in a predefined order.

In an expedient embodiment the guiding means comprises means for calculating from said stored positional information a suggested new orientation of the imaging device; means for comparing the current positional information with said suggested new orientation; means for providing instructions for the user to move the device towards said suggested new orientation; and means for indicating when said suggested new orientation has been substantially reached. By providing moving instructions and indicating when the desired orientation has been reached it is easy for the user to find the orientation.

When the current positional information comprises a vector indicating the viewing direction of the imaging device, the orientation of the device can be achieved in an easy way which is important e.g. in the situation where the device is rotated on a tripod, so that only the orientation is changed.

The provided positional information may further indicate the position of the imaging device, which is useful e.g. when capturing images of a two dimensional subject, such as a painting on the wall or the façade of a building, so that the whole object can be placed more or less in the same focal plane for the lens. In this case the current positional information may comprise x, y and z coordinates for the location of the imaging device.

The imaging device may comprise a motion sensor for providing said current positional information, and the motion sensor may comprise a gyroscope for providing the current positional information.

Further, the current positional information may comprise a current value of a zoom factor and an indication of lighting conditions in the viewing direction of the imaging device.

When the imaging device is further arranged to capture automatically an image when it is indicated that said suggested new orientation has been substantially reached, the device can just be moved according to the guiding instructions, and the device will then capture a sequence of images that are suitable for stitching.

The device may further be arranged to present said guiding of the user according to a selected one of a number of different stitching models indicating how images should be stitched together. Examples of such models could be horizontal panorama left to right, horizontal panorama right to left or vertical panorama top to bottom.

When the device is further arranged to control a zoom factor in dependence of the current positional information and the positional information stored for said at least one image, the zoom can compensate if the imaging device is moved to a position somewhat different from the suggested new position. If, for instance, the device is moved a bit too much so that the images do no longer overlap, zooming out can make them overlap again.

When the device is further arranged to utilize, when a number of images has been captured and stored, the positional information stored for said images for providing a combined image by stitching said images together, the stitching process can be simplified, because the stitching algorithm does not have to calculate such positional information.

BRIEF DESCRIPTION OF THE DRAWINGS

The invention will now be described more fully below with reference to the drawings, in which FIG. 12 shows a template in which three images can be filled in.

DETAILED DESCRIPTION OF EMBODIMENTS

Figure 1:
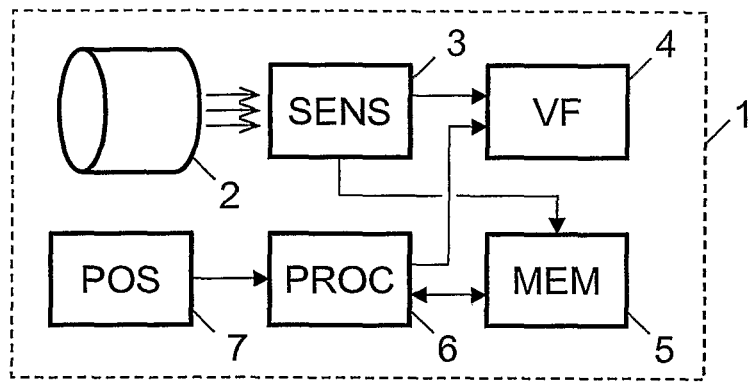
FIG. 1 shows a block diagram of an imaging device.

A block diagram of an imaging device 1 is illustrated in FIG. 1. The imaging device 1 can be a digital camera, a mobile phone with built-in camera or any other electronic device capable of capturing digital images. The device 1 has a lens 2 and an imaging sensor 3 on which the incident light through the lens 2 is focussed, so that an image of the subject seen through the lens 2 is formed on the sensor 3. The current image on the sensor 3 is shown to the user of the device on a viewfinder 4, so that he can check the subject seen through the lens 2 before an image is captured. When an image is captured the image currently detected by the imaging sensor 3 is transmitted to a memory 5 in which the image is stored. This process is controlled by a processor unit 6.

The images stored in the memory 5 may subsequently be used for a stitching process, in which overlapping images are combined to a larger or panoramic image. This stitching process may be performed in the imaging device 1 or, which is more usual, in a separate device such as a personal computer on which a stitching algorithm is installed. In the latter case the stored images are either transmitted to the computer from the memory 5, or this memory is moved to the computer.

In order to be able to perform the stitching process a series of overlapping images must have been captured and stored in the memory 5. To help the user in capturing a series of overlapping images, the imaging device 1 also has a positional unit 7 providing positional information which comprises a vector indicating the direction of the lens 2. The positional unit 7 includes a motion sensor, which can typically be a gyroscope, but also other types of sensors can be used. It is noted that instead of having the positional unit 7 integrated in the imaging device 1, it could also be placed in an accessory device that can be connected to the imaging device 1. The positional information could also be provided from e.g. a "digital" tripod indicating the orientation of an imaging device mounted thereon.

Figure 2:
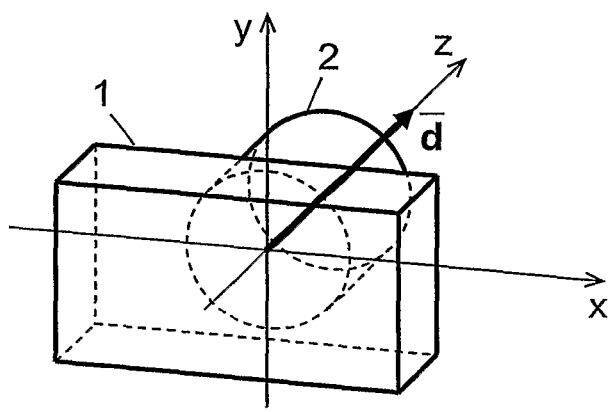
FIG. 2 shows an imaging device in an coordinate system at the time of capturing a first image.
Figure 3:
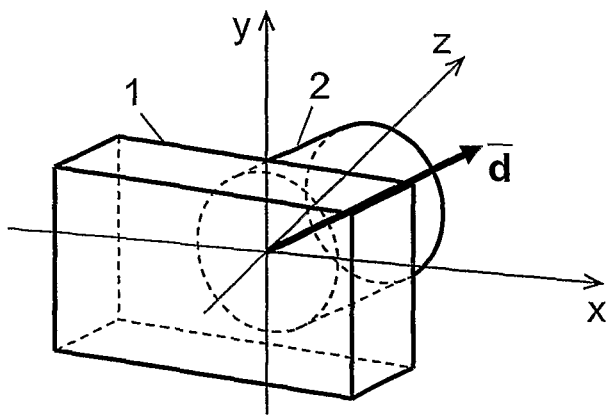
FIG. 3 shows the imaging device of FIG. 2 after it has been turned.

When a user takes the first one of a series of overlapping pictures the positional unit 7 is activated, and it defines a coordinate system with x, y and z axes according to the position and orientation of the imaging device 1 at the time of capturing the first image. This is illustrated in FIG. 2 in which the vector $\bar{d}$ indicates the direction of the lens 2 when the positional unit 7 is activated. It is seen that the coordinate system is arranged so that the direction of the z axis coincides with the direction of the vector $\bar{d}$ at the time of capturing the first image. At the same time the positional unit 7 starts tracking the vector $\bar{d}$ indicating the direction of the lens 2 over time. FIG. 3 shows a situation where the imaging device 1 has been turned so that the vector $\bar{d}$ no longer points in the direction of the z axis.

Knowing the size of the sensor 3 and the properties of the lens 2 (including focus, zoom etc.) and the direction of the vector $\bar{d}$ at the time of capturing the first image the positional unit 7 can calculate a suggested new direction of the imaging device 1, i.e. of the vector $\bar{d}$, in which an image can be captured that overlaps the first image sufficiently for the two images to be stitched in a later stitching process, provided the position of the imaging device 1 is substantially unchanged. By comparing the current direction of the vector $\bar{d}$ with the suggested new direction of the vector $\bar{d}$ guiding instructions can be provided in the viewfinder 4, which helps the user to move the imaging device to the suggested new position. This is illustrated in more detail below.

Figure 4:
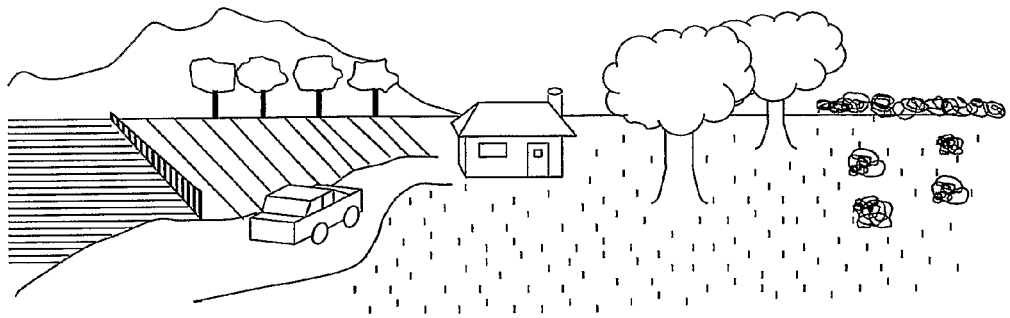
FIG. 4 shows a landscape of which a series of stitchable images can be captured.
Figure 5:
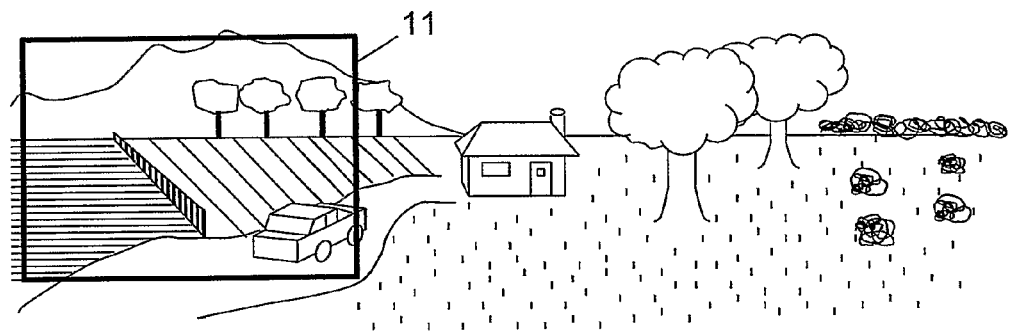
FIG. 5 shows that a first image of the landscape of FIG. 4 has been captured.

It is supposed that a user of the imaging device 1 wants to take a series of images of the landscape shown in FIG. 4 that can be stitched to a panoramic image, and that the images are to be taken from left to right. The imaging device is brought to a position where the section 11 shown in FIG. 5 can be seen in the viewfinder 4, and the first image is captured by pressing a shutter button or the like. Reference numeral 11 thus also indicates the first captured image. At the same time the positional unit 7 is activated as described above so that this orientation of the imaging device corresponds to the one shown in FIG. 2. The direction of the vector $\bar{d}$ is stored in the memory 5 together with the first captured image 11.

Figure 6:
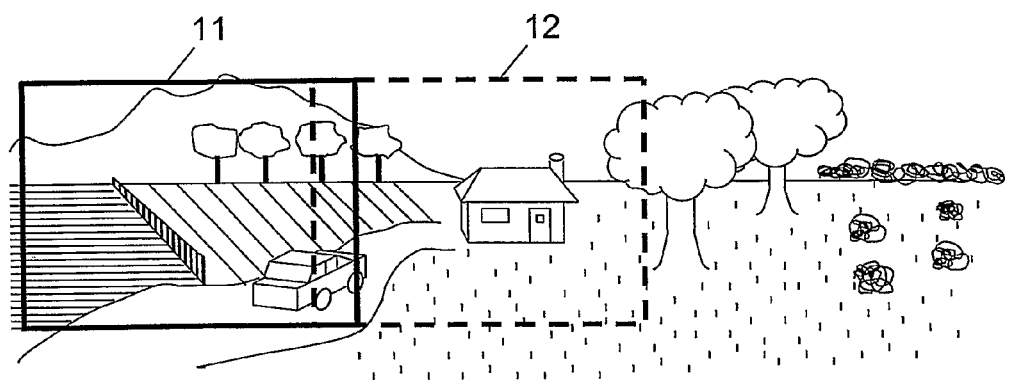
FIG. 6 shows a suggested next image of the landscape of FIG. 4.
Figure 7:
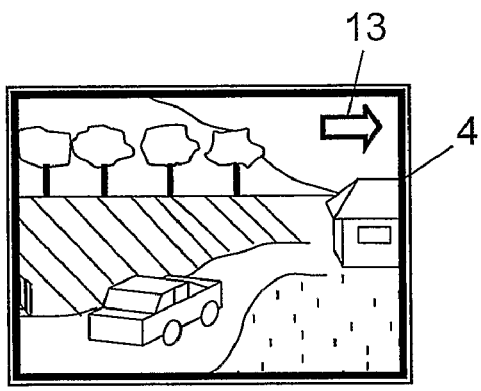
FIG. 7 shows an example of an arrow indicator which can be seen in a viewfinder when the imaging device is moved to the suggested new orientation.
Figure 8:
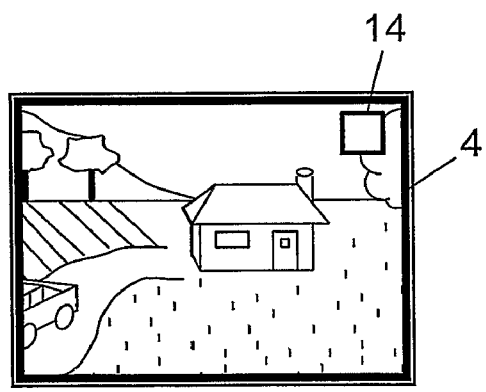
FIG. 8 shows an example of an indicator which can be seen in a viewfinder when the imaging device has reached the suggested new orientation.

In order to take the next image in the series the imaging device 1 should now be turned (as shown in FIG. 3) so that an image corresponding to the section 12 illustrated in FIG. 6 can be captured. The processor unit 6 thus calculates a corresponding suggested new direction of the vector $\bar{d}$. If, for instance, the opening angle of the lens is 45 degrees it could be suggested to turn the device 40 degrees in order to ensure sufficient overlap. While the user turns the imaging device 1 the positional unit 7 continuously provides the current direction of the vector $\bar{d}$ which is compared to the suggested new direction, and the difference between the two is used to guide the user, e.g. by means of indicators in shown in the viewfinder 4. FIG. 7 shows an example of what can be seen in the viewfinder 4 when the device has been moved approximately half-way to the suggested new orientation. An arrow 13 pointing to the right indicates that the device should be turned further to the right. In FIG. 8 the suggested new orientation has approximately been reached, and the next image can be captured, which is indicated by the square 14. The square is of course just an example and many other types of symbols could be used instead.

Figure 9:
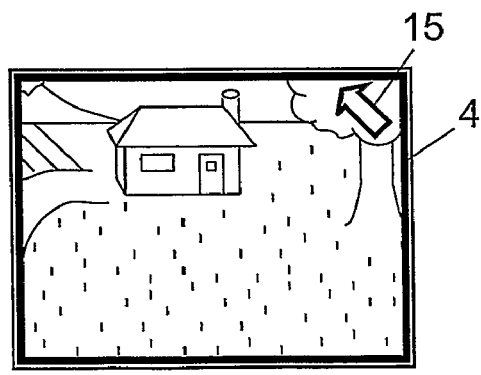
FIG. 9 shows an example of an arrow indicator which can be seen in a viewfinder when the imaging device has been turned too much to the right and down.

Small deviations from the suggested new orientation are acceptable. In FIG. 8 the device has actually been lowered a little bit, but this orientation is still sufficient for subsequent stitching of the images, and thus it is indicated by the square 14 that the next image can now be captured. If the device had been moved further down an arrow pointing up could guide the user to move the device up again. Similarly, if the device had been moved too much to the right, an arrow pointing to the left could guide the user to move the device back to the correct orientation. Also arrows pointing in other directions can be used, such as up to the right, etc. An example is shown in FIG. 9, in which the device has been turned too much to the right and down, so that the image shown in the viewfinder 4 cannot be stitched to the image 11. Therefore, the device must now be turned back to the left and up in order to reach the suggested new orientation. This is indicated by the arrow 15 pointing up to the left.

Figure 10:
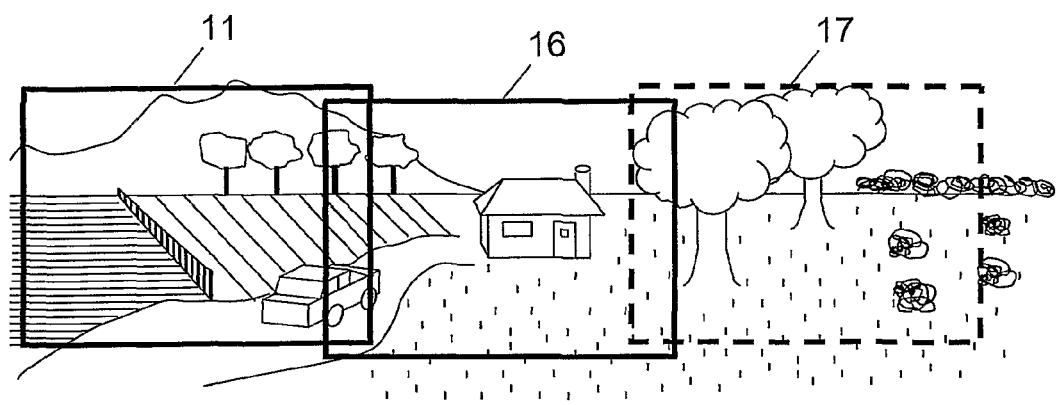
FIG. 10 shows that a second image of the landscape of FIG. 4 has been captured and a next image is suggested.

In FIG. 10 it is illustrated that the user has now captured the second image 16, and again the corresponding direction of the vector $\bar{d}$ has been stored together with the image. To take the next image in the series the imaging device 1 should now be turned further so that an image corresponding to the section 17 can be captured. Thus the processor unit 6 again calculates a corresponding suggested new direction of the vector $\bar{d}$.

The guiding instructions shown in the viewfinder, such as the arrow 13, will typically be presented according to one of a number of different stitching models that are preloaded in the imaging device 1. These models may include wide horizontal panorama left to right, wide horizontal panorama right to left, vertical panorama top to bottom, vertical panorama bottom to top, 360 degrees panorama or global projection. The processor 6 may also be able to detect one of the preloaded models based on the movement of the imaging device. If, for instance, the device is turned to the right after the capture of the first image, it may be assumed that the user wants to take a series of stitchable images according to the wide horizontal panorama left to right model.

It may even be possible to switch between models by analyzing the data from the positional unit 7. As an example, the device can switch from left to right panorama to right to left panorama by identifying the fact that the user directs the device to the left of the first captured image instead of to the right. Thus when e.g. two images have already been captured in the order from left to right, the device can provide guiding instructions depending on the movement of the device. If the device is moved to the right, the user is guided to take an image that can be stitched with the right edge of image 1, and if the device is moved to the left, the user is guided to take an image that can be stitched with the left edge of image 2. Thus the stitchable image may be expanded to either side during the process of capturing the images. This mixed mode is most effective in combination with a proper user interface like the indicators 13, 14 and 15 described above that guides the user to turn the imaging device into the correct position. When the user has directed the device towards the picture part that overlaps either edge of the first image, the user is prompted that it is a correct direction for a successful stitch, e.g. by the square 14, and if the device is moved to a direction outside the stitchable area, the user is requested to move the device back towards a usable direction, e.g. by arrows such as 13 and 15.

As mentioned above, the square 14 shown in FIG. 8 or a similar symbol indicates to the user that the suggested new orientation has approximately been reached, and that he can now capture the next image. However, the device can also be arranged to capture the next image automatically when the correct orientation has been reached. The user then just moves the imaging device according to the arrow indicator, and each time a correct orientation has been reached, a new image is captured automatically and the arrow indicator guides the user further to the next suggested new orientation. In this way it is very easy to capture a series of stitchable images, because the imaging device can just be turned so that the panoramic scene is covered as guided by the arrow indicator, and the images are then automatically taken according to the selected stitching model, e.g. three images left to right.

Instead of, or in combination to, indicating by e.g. arrows 13 and 15 how the user should move the imaging device to arrive at the suggested new orientation, the device could also control an external motorized tripod to automatically move the device to this orientation.

Figure 11:
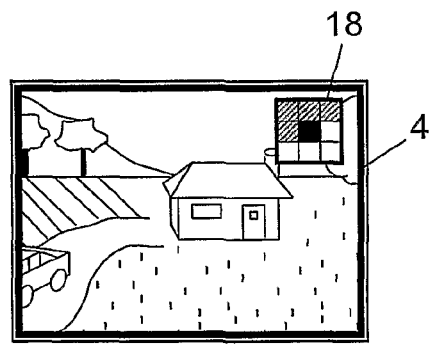
FIG. 11 shows an example of an indicator which can be seen in a viewfinder and which indicates that four out of nine images has been taken.

Since the imaging device 1 knows the lens direction when a picture is taken, it is also possible to fill in a stitching template to form e.g. a panoramic picture. Also this method is accompanied with a suitable interface that guides the user to move the device to a correct direction. This can be the arrows described above, but also a symbolic icon that forms a template "matrix" showing what is filled in and what is not can be used as a guide. An example is shown in FIG. 11 where the icon 18 indicates that nine images, which can be stitched to a three times three panorama, are to be captured. It is indicated that four images have already been captured, and the imaging device is now in an orientation ready for capturing the fifth image.

Figure 12:
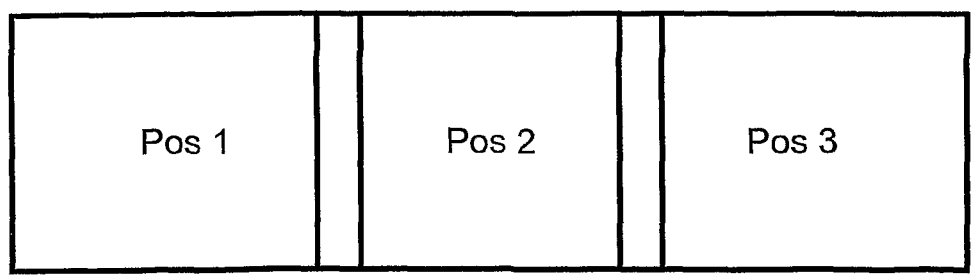
Figure 13:
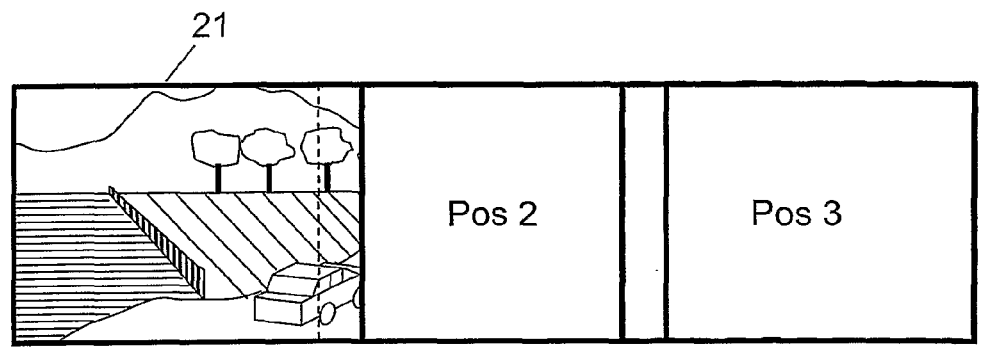
FIG. 13 shows that a first image has been captured and filled into the template of FIG. 12.
Figure 14:
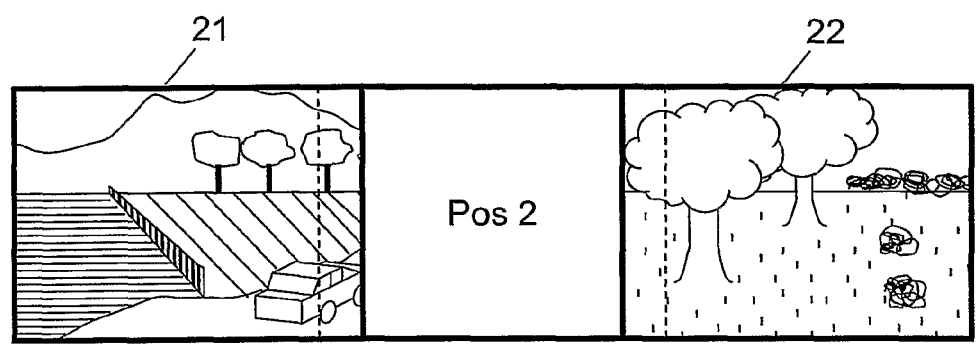
FIG. 14 shows that two images has been captured and filled into the template of FIG. 12.
Figure 15:
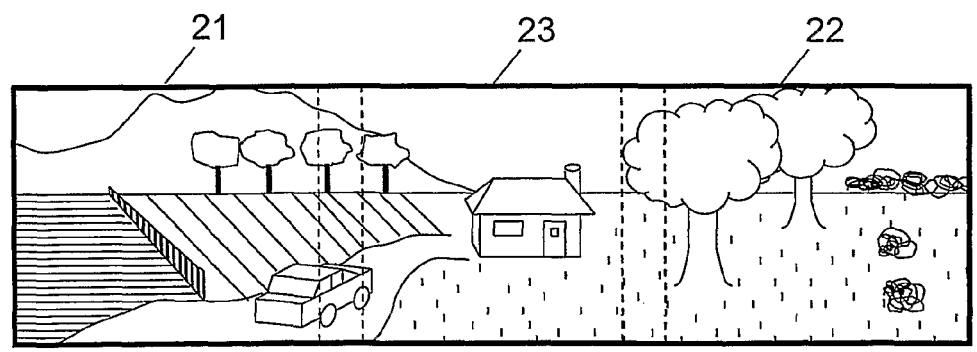
FIG. 15 shows that three images has been captured and filled into the template of FIG. 12.

The icon indicating the template may also show miniature versions of the images already captured. This is illustrated in FIGS. 12 to 15 where a horizontal panorama of three images is to be captured. FIG. 12 shows an icon illustrating the three positions Pos 1, Pos 2 and Pos 3 before any of the images has been captured. The mode is first activated when the first image is taken, e.g. Pos 1. It does not matter in what order the images are taken since the imaging device knows how the user is moving the device. In FIG. 13 the first image 21 has been captured and is shown in Pos 1 of the icon. Similarly, in FIG. 14 the image 22 has been filled into Pos 3, and finally in FIG. 15 the image 23 has been filled into Pos 2, and the panorama is complete. This icon and the icon 18 of FIG. 11 may of course be combined with the arrow indicators described earlier, so that the arrows guides the user to turn the imaging device, and when a correct orientation has been reached e.g. the icon 18 indicates to the user which one of the positions in the template can now be captured.

As mentioned above, the positional unit 7 provides positional information comprising the vector $\bar{d}$ indicating the direction of the lens 2. In many situations where a series of images forming a panorama of a three dimensional scene is to be captured, this is sufficient because the position of the imaging device should remain substantially unchanged during the process of capturing the images in order to obtain stitchable images. However, there are also situations in which it would be expedient to change the position of the imaging device instead of or in combination with the direction of the lens when capturing a series of images to be stitched. This is mainly situations where the object is two dimensional, such as a painting on the wall or the façade of a building, so that the whole object can be placed more or less in the same focal plane for the lens. Therefore the positional unit 7 may be arranged to provide the relative position of the imaging device in form of the x, y and z coordinates in the coordinate system mentioned above. The relative position of the imaging device is then used in the same way as the lens direction above to provide the instructions or indications guiding the user to move the imaging device to a correct position for the next image to be captured.

Also in this case a gyroscope may be used in the positional unit 7 to provide the positional information, but other types of position sensors may also be used instead of or in combination with the gyroscope. As examples, global positioning systems, ultrasonic sensors and electromagnetic sensors may be mentioned.

Figure 16:
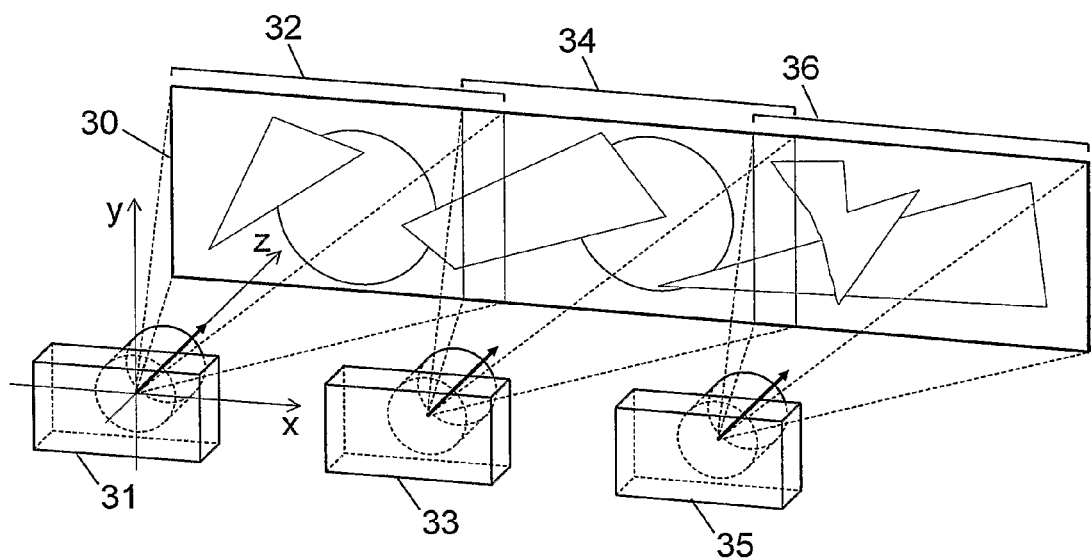
FIG. 16 shows how a series of stitchable images of a wall painting can be captured.

FIG. 16 shows an example where a wall painting 30 is to be photographed as a panorama. First the imaging device is positioned in position 31 and an image covering the section 32 of the painting 30 is captured. At the same time the positional unit 7 is activated, and the coordinate system with the x, y and z axes is defined according to the position and orientation of the device. The position and lens direction at that time is stored together with the image, and a suggested new position 33 is calculated, i.e. it is suggested to move the device in the direction of the x axis. The position and orientation of the device is now tracked and guiding instructions presented to the user, e.g. as the arrow 13 in FIG. 7. When position 33 is reached this can be indicated by the square 14 in FIG. 8 or a similar symbol, and an image covering the section 34 of the painting 30 is captured. It is then suggested to move the device to position 35 in which the section 36 of the painting 30 can be captured. In FIG. 16 only the position of the device is changed, while the orientation of the device, i.e. the direction of the lens, is maintained, but in some situations it will be convenient to change position as well as orientation, and therefore the system tracks them both and utilizes them for the guiding instructions.

Other parameters may also be stored together with each captured image and tracked during movement of the device. If the lens 2 of the imaging device 1 has a zoom function, the zoom setting influences the viewing angle of the lens, and thus the calculation of a suggested new orientation or position of the device depends on the zoom factor of the already captured image as well as the current zoom factor. In some cases the processor 6 could also automatically control the zoom factor by analyzing the positional information provided by the positional unit 7. If the imaging device, e.g. in the situation illustrated in FIG. 16, is moved further away from the subject, the zoom may zoom in in order to compensate for the movement. Similarly, it may zoom out to compensate when the device is moved closer to the subject. If the imaging device in the situation shown in FIGS. 6, 7 and 8 is turned too much to the right so that the current view does not overlap the already captured image anymore, the device can zoom out until a sufficient overlap is present again instead of guiding the user to turn the device back to the left. The zoom factor can be obtained from a zoom detector mounted on the lens.

Especially in the situation shown in FIG. 16 the focus setting of the lens or the distance from the device to the subject can be relevant when calculating the suggested new orientation or position of the device. These parameters may be obtained from a focusing detector mounted on the lens and from a distance meter. Also the lighting conditions may be detected and utilized.

The data stored together with the images, such as position, orientation, zoom and focus data, may preferably be stored in the same format as the image itself, such as JPEG Exif 2.2. It is also relevant that the images are stored in a format that indicates that the image is a part of the same stitching session. A file format that bunch the images into one file, such as ZIP or other file formats that contain all images of a session, could be used.

As mentioned above the positional information is utilized in the calculation of a suggested new orientation or position during the process of capturing the images for later stitching, but since the positional information corresponding to each captured image is stored together with the image, it can also be used as an assistance in the subsequent stitching process. The stitching algorithm uses a couple of transformations of an image to perform an advanced stitch. The simple case used for stitching is panorama stitching. Panorama stitching is horizontal and it only stitches left to right and right to left. The more advanced stitching modes enable stitching in any part of the image. These stitching modes are most often used on a personal computer with large calculation capacity. The pictures to be stitched are analyzed in every possible way in order to perform a stitch. This means rotation, skew, resize, translation, slanting, etc. of the image. This is more or less to emulate the position and/or the orientation of the imaging device when the images were captured. Instead of using powerful computer resources to try to find out how the device was oriented during the capture the data from the positional unit in combination with the other parameters stored with the images will be used as input to the stitching algorithm. Thus the stitching algorithm will get a hint on how the imaging device was positioned or oriented at the time when the image was taken, and the stitching can be simplified considerably.

Although a preferred embodiment of the present invention has been described and shown, the invention is not restricted to it, but may also be embodied in other ways within the scope of the subject-matter defined in the following claims.

The invention claimed is:

1. A method of capturing a sequence of images by an imaging device and storing said images in a digital format, the method comprising:

guiding, after having captured and stored at least one image, a user to move the imaging device so that an image that is configured to be stitched to said at least one captured and stored image can be captured;

providing current positional information indicating a current orientation and position of the imaging device;

storing, for each captured and stored image, positional information indicating an orientation and position of the imaging device at a time of capturing a corresponding image;

utilizing the current positional information and the stored positional information for said at least one captured and stored image to guide the user to move the imaging device to an orientation such that the image that is configured to be stitched to said at least one captured and stored image can be captured;

automatically controlling a current zoom factor to adjust a zoom setting of a lens of the imaging device based on a comparison of the current positional information and the stored positional information for said at least one captured and stored image; and automatically capturing the image that is configured to be stitched to said at least one captured and stored image in response to automatically controlling the current zoom factor, wherein automatically controlling the current zoom factor further comprises:

automatically controlling the current zoom factor based on the current positional information, a stored zoom factor stored at the time of capturing said at least one captured and stored image, and the stored positional information for said at least one captured and stored image to compensate for a difference in distance between the imaging device and a subject of the image to be stitched relative to that of said at least one captured and stored image, and wherein the difference in distance between the imaging device and a subject of the image to be stitched relative to that of said at least one captured and stored image is determined using a distance meter.

2. A method according to claim 1, wherein utilizing the current and stored positional information comprises:
calculating from said stored positional information a suggested new orientation of the imaging device;
comparing the current positional information with said suggested new orientation;
providing instructions for the user to move the imaging device towards said suggested new orientation; and
indicating when the current orientation of the imaging device is substantially similar to said suggested new orientation.

3. A method according to claim 2, wherein the method further comprises:
automatically capturing an image when it is indicated that the current orientation of the imaging device is substantially similar to said suggested new orientation.

4. A method according to claim 1, wherein said current positional information comprises a vector indicating a viewing direction of the imaging device.

5. A method according to claim 4, wherein said current positional information further comprises an indication of lighting conditions in the viewing direction of the imaging device.

6. A method according to claim 1, wherein the provided current positional information further indicates a current position of the imaging device.

7. A method according to claim 4, wherein the current positional information comprises x, y and/or z coordinates for the location of the imaging device.

8. A method according to claim 1, wherein said current positional information is provided by a motion sensor in the imaging device.

9. A method according to claim 8, wherein a gyroscope is utilized in the motion sensor to provide the current positional information.

10. A method according to claim 1, wherein said current positional information further comprises a current value of a zoom factor.

11. A method according to claim 1, wherein utilizing the current and stored positional information comprises:
guiding the user according to a selected one of a number of different stitching models indicating how images should be stitched together.

12. A method according to claim 1, wherein the method further comprises:
after having captured and stored a plurality of images, utilizing the stored positional information for said plurality of images to provide a combined image by stitching said plurality of images together.

13. An imaging device for capturing a sequence of images, said device comprising:
storing means for storing images in a digital format; and
guiding means for guiding a user, when at least one image has been captured and stored, to move the imaging device so that an image that is configured to be stitched to said at least one captured and stored image can be captured;
means for providing current positional information indicating a current orientation and position of the imaging device;
means for storing, for each captured and stored image, positional information indicating an orientation and position of the imaging device at a time of capturing a corresponding image;
means for utilizing the current positional information and the stored positional information for said at least one captured and stored image to guide the user to move the imaging device to an orientation such that the image that is configured to be stitched to said at least one captured and stored image can be captured;
means for automatically controlling a current zoom factor to adjust a zoom setting of a lens of the imaging device based on a comparison of the current positional information and the stored positional information for said at least one captured and stored image; and
means for automatically capturing the image that is configured to be stitched to said at least one captured and stored image in response to automatically controlling the current zoom factor,
wherein the device includes a distance meter that determines a difference in distance between the imaging device and a subject of the image to he stitched relative to that of said at least one captured and stored image, and
wherein the device is further configured to automatically control the current zoom factor based on the current positional information, a stored zoom factor stored at the time of capturing said at least one captured and stored image, and the stored positional information for said at least one captured and stored image to compensate for the difference in distance between the imaging device and the subject of the image to be stitched relative to that of said at least captured and stored one image.

14. An imaging device according to claim 13, wherein the guiding means comprises:
means for calculating from said stored positional information a suggested new orientation of the imaging device;
means for comparing the current positional information with said suggested new orientation;
means for providing instructions for the user to move the imaging device towards said suggested new orientation; and
means for indicating when the current orientation of the imaging device is substantially similar to said suggested new orientation.

15. An imaging device according to claim 14, wherein the device is further configured to automatically capture an image when it is indicated that the current orientation of the imaging device is substantially similar to said suggested new orientation.

16. An imaging device according to claim 13, wherein said current positional information comprises a vector indicating a viewing direction of the imaging device.

17. An imaging device according to claim 16, wherein said current positional information further comprises an indication of lighting conditions in the viewing direction of the imaging device.

18. An imaging device according to claim 13, wherein the current positional information further indicates a current position of the imaging device.

19. An imaging device according to claim 13, wherein said current positional information comprises x, y and z coordinates for the location of the imaging device.

20. An imaging device according to claim 13, wherein the imaging device comprises a motion sensor configured to provide said current positional information.

21. An imaging device according to claim 20, wherein the motion sensor comprises a gyroscope configured to provide the current positional information.

22. An imaging device according to claim 13, wherein said current positional information further comprises a current value of a zoom factor.

23. An imaging device according to claim 13, wherein the device is further configured to guide the user according to a selected one of a number of different stitching models indicating how images should be stitched together.

24. An imaging device according to claim 13, wherein the device is further configured to utilize, when a plurality of images has been captured and stored, the stored positional information for said plurality of images to provide a combined image by stitching said plurality of images together.

25. An imaging device according to claim 13, wherein the device is a digital camera.

26. An imaging device according to claim 13, wherein the device comprises a mobile telephone.

* * * * *

UNITED STATES PATENT AND TRADEMARK OFFICE
CERTIFICATE OF CORRECTION

PATENT NO. : 8,077,213 B2  Page 1 of 1
APPLICATION NO. : 11/571497
DATED : December 13, 2011
INVENTOR(S) : Gulliksson It is certified that error appears in the above-identified patent and that said Letters Patent is hereby corrected as shown below:

In the Claims:
Column 11, Claim 7, Line 37: Please correct "according to claim 4"
to read -- according to claim 6 --

Signed and Sealed this
Third Day of April, 2012

David J. Kappos
*Director of the United States Patent and Trademark Office*